United States Patent [19]

Nakata et al.

[11] 3,872,915

[45] Mar. 25, 1975

[54] VACUUM SEALED MOLDING APPARATUS
[75] Inventors: Kunii Nakata, Nagano; Masao Hondo, Susaka, both of Japan
[73] Assignee: Kabushiki Kaisha Akita, Susaka Nagano Pref., Japan
[22] Filed: Oct. 2, 1972
[21] Appl. No.: 294,104

[30] Foreign Application Priority Data
Oct. 8, 1971  Japan.............................. 46-79572

[52] U.S. Cl. .............................................. 164/160
[51] Int. Cl. .............................................. B22c 15/22
[58] Field of Search ............ 164/7, 37, 39, 40, 160, 164/170, 195, 203, 206, 260, 261

[56] References Cited
UNITED STATES PATENTS
3,293,703  12/1966  Taccone ............................ 164/160
3,335,787  8/1967  Dietert et al...................... 164/206 X
3,789,907  2/1974  Nakata et al. .......................... 164/7

FOREIGN PATENTS OR APPLICATIONS
1,106,514  12/1955  France................................ 164/160
277,509  11/1964  Netherlands....................... 164/160

Primary Examiner—Francis S. Husar
Assistant Examiner—John E. Roethel
Attorney, Agent, or Firm—Stevens, Davis, Miller & Mosher

[57] ABSTRACT

A mold producing apparatus comprising a pattern, at least one shield member, at least one flask, a filler material in particulate form filled in said flask, and means for evacuating the interior of said flask, with the flask having mounted therein at least one evacuating line.

1 Claim, 6 Drawing Figures

3,872,915

VACUUM SEALED MOLDING APPARATUS

This invention relates to a mold producing apparatus for casting a molten metal therein.

Proposals have been made to use a negative or sub-atmospheric pressure to maintain the integrity of a mold used for casting a melt therein as a new mold producing method. According to this method, a shield member is brought into intimate contact at one surface thereof with one surface of a pattern, a flask is brought into engagement with the other surface of the shield member opposite to said one surface thereof which is maintained in intimate contact with the pattern, a filler material comprising heat resisting particles is filled in the flask or in a space disposed opposite the pattern with respect to the shield member, a negative or sub-atmospheric pressure is induced in the filler material so as to draw by suction the shield member toward the filler material, and the pattern is removed to form a cavity in which a melt is poured.

One of the objects of this invention is to provide a mold producing apparatus adapted to carry the aforementioned mold producing method into practice in which the flask is evacuated through at least one evacuation line provided in the flask.

Another object of the invention is to provide a mold producing apparatus in which the flask is formed in the shape of a frame having open top and bottom surfaces, and at least one evacuation line is provided in the flask for withdrawing air from the flask to induce a negative or sub-atmospheric pressure therein. This arrangement is effective to permit molding by horizontal filling of the flask with a particulate material to be performed readily, and to produce a good casting of a large size by withdrawing air uniformly from a flask of a large size.

Another object of the invention is to provide a mold producing apparatus in which one or a plurality of evacuation lines are provided in the flask, such evacuation lines being interconnected by a communication passage provided on the flask so that the lines can be connected through one connecting portion to a vacuum pump.

Still another object of the invention is to provide a mold producing apparatus in which the flask is formed with support projections one of which is formed in the shape of a cylinder and maintained in communication with the communication passage. This arrangement is effective to permit the flask to be readily moved or pivoted because the communication passage can be connected to a vacuum pump through the support projections.

A further object of the invention is to provide a mold producing apparatus in which the evacuation lines are disposed along the shaping surface of the pattern. This arrangement is effective to permit the particles of the filler material to be distributed uniformly between the evacuation lines and the shaping surface and to maintain the hardness of the mold producing surface at a uniform level, thereby preventing warping or deformation of the product when it cools off.

Other and additional objects as well as features and advantages of the invention will become evident from the description set forth hereinafter when considered in conjunction with the accompanying drawings, in which.

Figure 1:
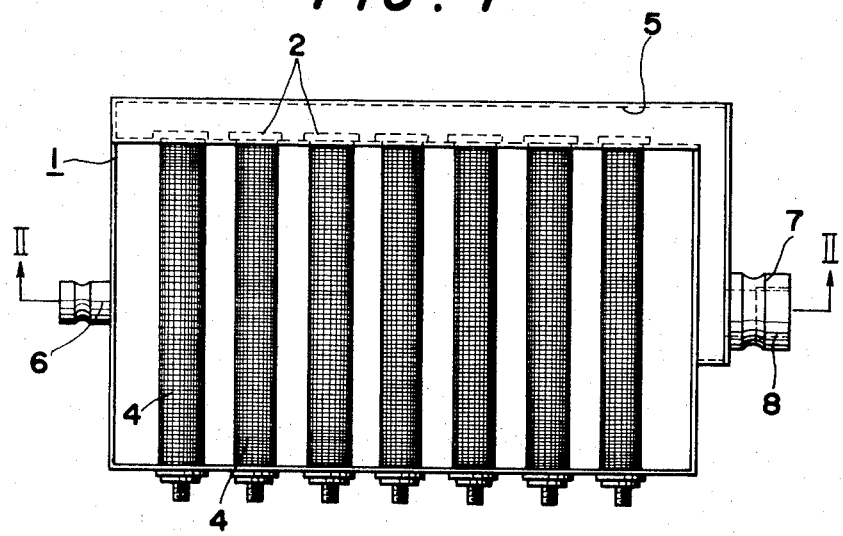
FIG. 1 is a plan view of the essential parts of the mold producing apparatus comprising one embodiment of this invention.
Figure 2:
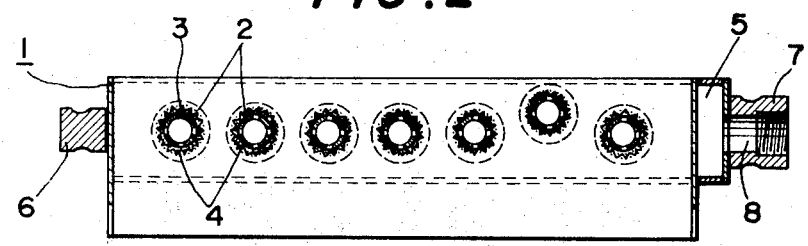
FIG. 2 is a sectional view taken along the line II—II of FIG. 1.

In FIG. 1 to FIG. 4, 1 designates a rectangular flask having open top and bottom surfaces and provided therein with a plurality of evacuation lines 2 arranged in side-by-side relationship and extending two long opposite side walls of the flask 1. Each of the evacuation lines 2 is formed in its periphery with a multitude of openings 3 for permitting air to pass therethrough and has a filter 4 wound around the line 2, the filter 4 being made of wire netting or the like.

The flask 1 has a hollow communication passage 5 formed to extend along one long side wall and one end thereof. The evacuation lines 2 are each maintained at one end thereof in communication with the communication passage 5.

The flask 1 is formed at opposite ends thereof with support projections 6 and 7, one support projection 7 being cylindrical in shape and formed therein with a passage 8 which is maintained in communication with the communication passage 5.

Figure 3:
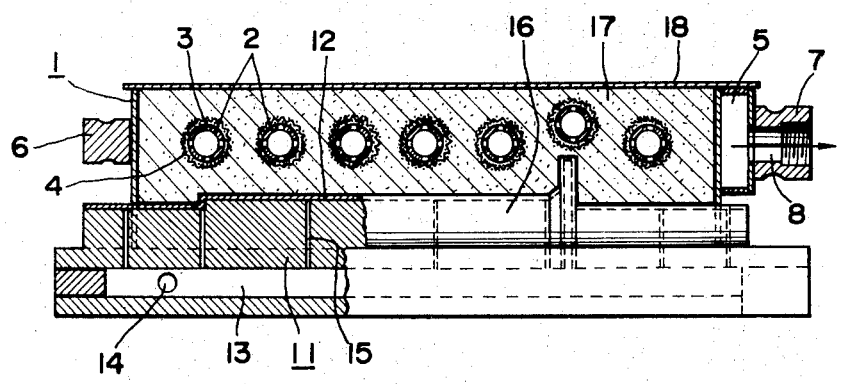
FIG. 3 is a side view of the apparatus, with certain parts being cut out, showing the manner in which a mold is being produced.

In Fig. 3, 11 designates a pattern made as of wood and formed in two pieces. A shaping surface 12 is formed on one surface of one of the members of the pattern 11, and a cave 13 maintaining communication with outside through an evacuation hole 14 is formed in the one pattern member. A member of small communication ducts 15 maintaining the cave 13 in communication with the shaping surface 12 are formed in the one pattern member.

In producing a mold, a shield member 16 which may be a synthetic resin film of about 20 to 30 micron thick is applied to the shaping surface 12 of the one pattern member while the shield member 16 is being heated. At the same time, air in the space between the shaping surface 12 of the one pattern member and the shield member 16 is drawn by suction through the cave 13 and the small communication ducts 15 by a vacuum pump or other suction means connected to the evacuation hole 14 in the one pattern member, so that the shield member 16 adheres to the shaping surface 12 of the one pattern member.

Then, a flask 1 is placed on the shaping surface of the one pattern member through the shield member 16, and a filler material 17 which may be molding sand or other heat resisting particles is poured in the flask 1 from above. The one pattern member and the flask 1 are caused to vibrate as a unit by means of a vibrator (not shown) to pack solidly the filler material 17 in the flask 1.

The upper surface of the flask 1 is covered with a lid 18 which may be a synthetic resin film, and air in the flask 1 is drawn by suction through the passage 8, communication passage 5 and evacuation line 2 by a vacuum pump or other suction means connected to the support projection 7 so as to induce a negative or subatmospheric pressure in the flask 1 and draw the shield member 16 and lid 18 toward the filler material 17 in the flask 1, thereby preventing relative movements of the particles of the filler material 17.

Thereafter, a fan or other blower means (not shown) is connected to the evacuation hole 14, and the one pattern member is detached from the flask 1 while supplying air under pressure to the space between the shaping surface 12 of the one pattern member and the shield member 16 through the cave 13 and small ducts 15 from the blower means. Thus, the shield member 16 shaped in conformity with the shaping surface 12 of the one pattern member remains in engagement with the filler material 17 in the flask 1, so that the filler material 17 is shaped into a desired shape.

Figure 4:
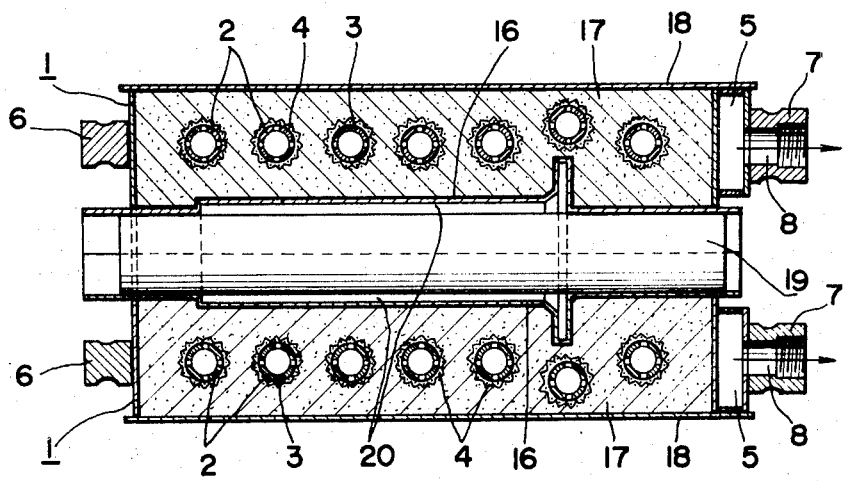
FIG. 4 is a sectional view of the apparatus showing a cavity being formed therein.

A mold producing operation similar to the aforementioned mold producing operation is performed with reference to the other member of the pattern 11. The first flask 1 containing the filler material 17 shaped into the desired shape in conformity with the shaping surface of one pattern member and the second flask containing the filler material 17 shaped in conformity with the shaping surface of the other pattern member in the same manner as described with reference to the first flask are brought into face-to-face relationship, with a core 19 being interposed between the two flasks and a cavity 20 of the same shape as a desired product being formed between the core 19 and the shield members 16, 16 as shown in FIG. 4. A mold is thus produced.

In producing a casting by employing this mold, a molten metal or alloy, such for example as cast iron, cast steel, stainless steel, aluminum or other metal or an alloy thereof, is poured into the cavity 20 to produce a desired cast product.

Another embodiment of the invention will be described with reference to FIG. 5 and FIG. 6.

Figure 5:
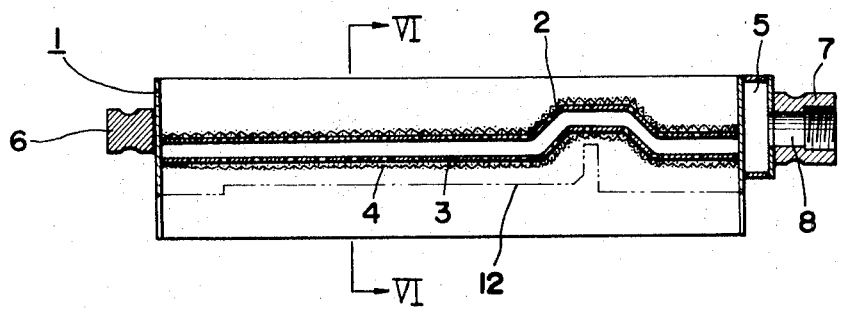
FIG. 5 is a sectional view of the essential parts of the mold producing apparatus comprising another embodiment of this invention.
Figure 6:
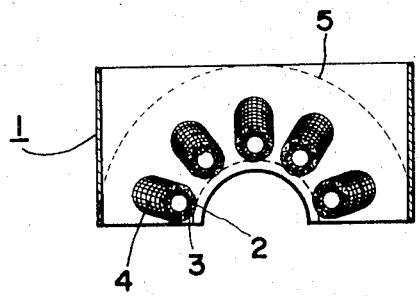
FIG. 6 is a sectional view taken along the line VI—VI of FIG. 5.

FIG. 5 and FIG. 6 show another embodiment in which a number of evacuation lines 2 provided in the flask 1. As shown, a number of evacuation lines 2 arranged in side-by-side relationship and extending between the opposing short walls of the flask 1 are disposed along the shaping surface 12 of the member of the pattern 11, but only one evacuation line may be provided in the present invention in place of a number of evacuation lines to be disposed along the shaping surface 12.

By arranging the evacuation lines in this way, it is possible to cause uniform suction force to be exerted on the shaping surface 12 of the pattern member.

The shield member 16 has been described as being in the form of a film of a synthetic resinous material. It is to be understood that, in place of using a synthetic resin film, a synthetic resinous material in liquid form may be applied to the pattern to form a synthetic resin film thereon.

We claim

1. Mold producing apparatus consisting of at least one flask;

a heat resisting, binder-free material in said flask as a filler mass with at least one indentation defining a hollow mold space;

a synthetic plastic foil surrounding the filler mass at the mold space;

at least one embedded evacuation line in said filler mass;

a communication passage in said flask engaging said at least one evacuation line; and support projections at opposite ends of said flask, one of said support projections having a passage arranged to communicate with said each evacuation line through said communication passage and further adapted to be connected to a vacuum source whereby said filler mass may be subjected to a vacuum.

* * * * *